United States Patent [19]
Lowrie

[11] 3,726,068
[45] Apr. 10, 1973

[54] SEPARATOR
[75] Inventor: Neely E. Lowrie, Tulsa, Okla.
[73] Assignee: Combustion Engineering, Inc., New York, N.Y.
[22] Filed: Nov. 3, 1970
[21] Appl. No.: 86,559

[52] U.S. Cl. ..................55/421, 55/458, 210/512
[51] Int. Cl. ..............................................B01d 45/12
[58] Field of Search.....................55/177, 191, 204, 55/205, 391, 421, 458, 459; 209/211; 210/512

[56] References Cited

UNITED STATES PATENTS

| | | | |
|---|---|---|---|
| 1,069,048 | 7/1913 | Wetherbee | 209/211 |
| 2,098,608 | 11/1937 | Berges | 209/211 |
| 2,565,343 | 8/1951 | Benham | 210/512 |
| 2,852,091 | 9/1958 | Boudreaux et al. | 55/421 |
| 2,952,330 | 9/1960 | Winslow | 55/204 |
| 3,045,828 | 7/1962 | Hume | 210/512 |
| 1,818,905 | 8/1931 | McGee | 55/391 |
| 1,897,332 | 2/1933 | Raymond | 55/204 |
| 3,481,118 | 12/1969 | Willis et al. | 55/459 |

Primary Examiner—Bernard Nozick
Attorney—Arthur L. Wade

[57] ABSTRACT

A vertically extended cylindrical vessel has an inlet for a mixture of fluidized materials arranged to develop centrifugal force upon the mixture. The mixture descends between the outside of an inverted cup structure mounted symmetrically within the vessel and the interior wall of the vessel. The flow of the lighter material phase of the mixture is reversed and removed near the top of the cup interior. The heavier material phase of the mixture continues to travel down the vessel wall interior and is removed near the bottom of the vessel.

1 Claim, 1 Drawing Figure

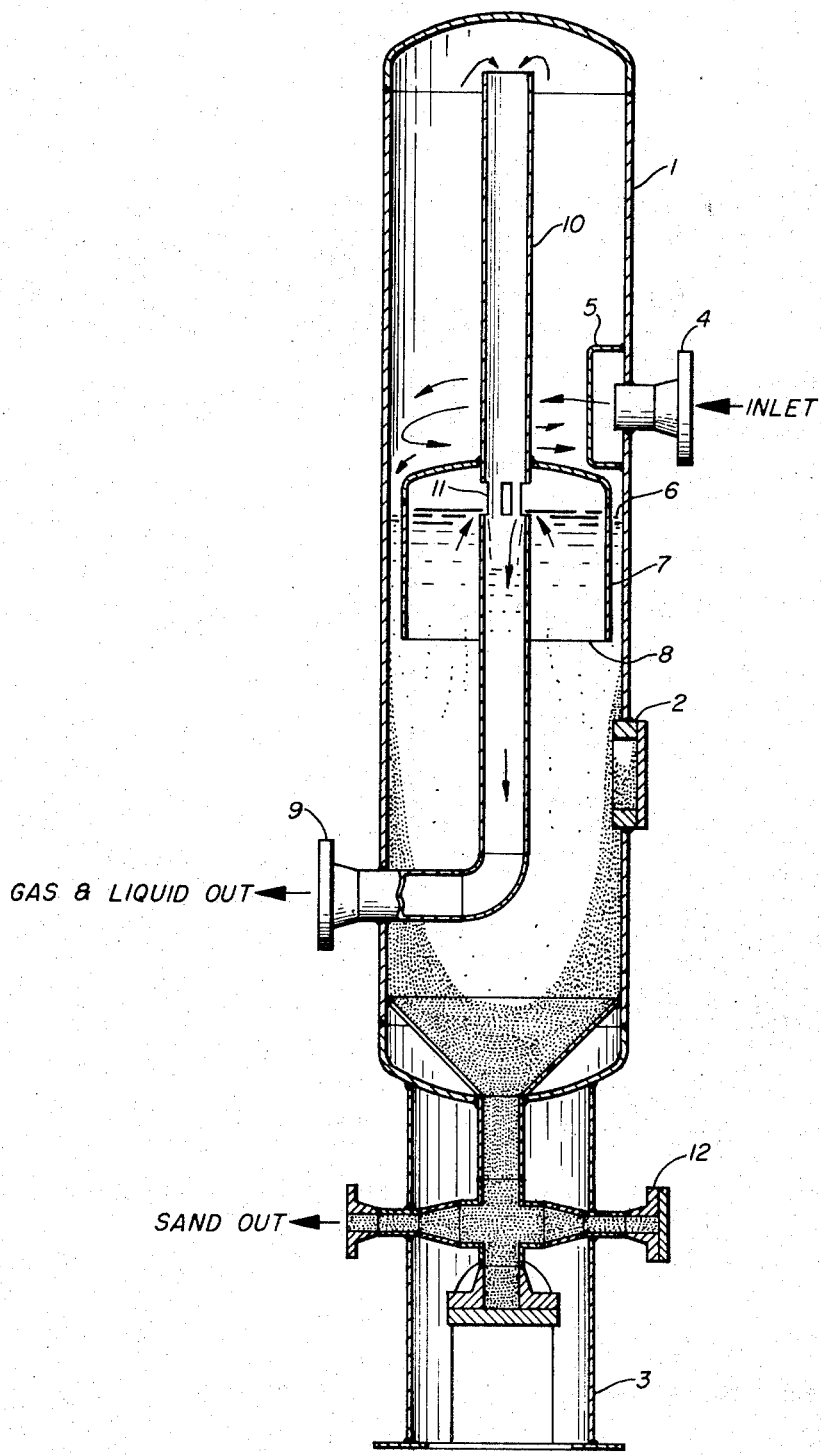

SEPARATOR

BACKGROUND OF THE INVENTION

1. Field of the Invention

The present invention relates to separating the components of a mixture of fluidized material by centrifugal and inertia forces. More particularly, the invention relates to removing solid material, such as sand, from oil well production.

2. Description of the Prior Art

The physical production from an oil well can range from substantially pure liquid hydrocarbons to combinations of water, gas, liquid and solid material generally referred to as sand. Even the solid material can be handled as fluidized material. Obviously, if a mixture of these various phases can reside in one location, gravity separation will take place to some degree. It is a standard object in the oil and gas industry to reduce the time of separation to reduce the time the products of the well are handled.

Oil well production mixtures have had sand centrifuged from them. But the power to drive the centrifuge pump is considerable. There is need for an arrangement in which the energy of the well stream can be used to generate centrifugal and inertial forces on the components of the stream to force their separation.

SUMMARY OF THE INVENTION

The present invention contemplates directing an oil well production stream upon the interior walls of a vertically extended cylindrical vessel and in a flow path of predetermined size to generate a centrifugal force upon the mixture of the stream to shift the heavier phase of the mixture to the wall. The flow direction of the lighter phase of the mixture is then abruptly changed from downwardly in the flow path to upwardly in utilizing the force of inertia upon residual heavier phase material to continue separation, the lighter phase material being removed at a point above the abrupt, upward change of direction.

Other objects, advantages and features of this invention will become apparent to one skilled in the art upon consideration of the written specification, appended claims, and attached drawing, wherein;

The drawing is a sectioned elevation of a vessel whose internal structure embodies the invention.

In the drawing, the shell of a separator vessel is depicted at 1. This is a simple, vertical cylinder. The interior of the vessel is accessible for cleaning and inspection through manway 2. The complete unit is mounted on a base 3.

The separator vessel is part of an elaborate system for handling oil production as it flows from a well. Several operations are performed on the production. We are presently concerned with only the relatively simple step of removing heavier material from the production prior to other operations. It is within this shell 1 that the energy of the well stream is employed to generate the centrifugal and inertial forces which bring about the desired separation.

The mixture of the oil well production flows into the shell, through inlet 4. Within the shell 1 a diverter structure 5 is mounted over the inlet to divert all of the production into a flow path along the interior wall of the shell.

Directly below the diverter 5 is a vertical passageway 6 which is sized to increase the velocity of the production flowing along the interior wall of the shell. Specifically, this passageway is formed by a partition spaced from the internal surface of the shell. More specifically, this partition is the vertical wall 7 of inverted cup 8.

Outlet conduit 9 extends as a conduit 10 up the center of shell 1 and terminates near the top of the shell interior. Passages, or openings, 11 are arranged in the side of conduit 9 to communicate the upper portion of cup 8 with conduit 10. The open top of conduit 10 communicates with the upper portion of shell 1.

The operation of this arrangement of structure disclosed in the drawing is now readily understood. It is already set forth how the mixture of production fluids is brought into the shell 1 and centrifuged on the interior wall of the shell by the diverter 5. The liquids and solids of the mixture descend. The gaseous fluids largely disengage and flow to the upper portion of the shell 1 and into outlet conduit 10.

The mixture of liquids and solids flow into passage 6 which is sized to establish a predetermined velocity for the downwardly flowing mixture which is being simultaneously centrifuged. The mixture discharges from the lower end of passage 6. The solids in the mixture, as the heavier phase, are forced to the vessel wall by the centrifugal force generated by the energy of the well stream and the diverter 5. The release of the fluids from the passage 6, and the provision of passages 11 to inlet 9, cause the lighter material to suddenly reverse their direction to flow upward. This sudden change of direction for the liquids and the centrifugal and inertial forces on the solids brings about a separation of the solid material from the lighter material. The inertial forces on the solid material cause it to continue its descent to the bottom of vessel 1. The disengaged lighter liquids flow upward for removal through outlet conduit 9.

Of course, gas from the upper portion of the vessel also flows out outlet conduit 9, joining the liquids from which the solids are separated. The solids collect in the bottom of the vessel and are removed by suitable jets 12.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawing is to be interpreted in an illustrative and not in a limiting sense.

I claim:

1. A separator to remove solids from oil well production, including,
   a vessel with side walls extended vertically and having top and bottom walls and providing an internal surface which is cylindrical and vertically extended, means including an entrance through the vessel side walls through which is flowed production containing solids over the internal surface to develop centrifugal force upon the solids which drives the solids to the internal surface and along which they descend by gravity, a conduit mounted within the vessel to extend axially within the vessel and providing a first opening at its upper end within the vessel above the entrance for production and a second opening below the entrance for production and extending its lower end external of the vessel, and a cup-like chamber opening downwardly and mounted on the conduit between the first and second opening and below the entrance for production, its external side wall extending parallel to the internal vessel surface and spaced a predetermined distance therefrom to form a passageway sized to increase the velocity of the liquids and solids flowing downwardly and an outlet for solids from the vessel, whereby gas of the production separates from the liquids above the cup-like chamber to enter the first opening and flow down the conduit to join the solid-free liquids flowing into the second opening after having flowed downward from the passageway and reversing to flow up into the downwardly opening cup-like chamber to the second conduit opening, the solids continuing to flow downward in separation from the liquids.

\* \* \* \* \*